3,235,509
METHOD FOR PRODUCING ANTIFOAM AGENTS

Siegfried Nitzsche and Ewald Pirson, Burghausen, Bavaria, Germany, assignors to Wacker-Chemie G.m.b.H., Munich, Bavaria, Germany
No Drawing. Filed Oct. 3, 1962, Ser. No. 227,990
5 Claims. (Cl. 252—358)

This invention relates to a novel method for preparing antifoam agents and to a new class of antifoam agents effective in alkaline systems.

The use of organosiloxane polymers particularly in mixture with silicas as antifoam agents in aqueous systems is well known. A variety of commercial antifoam agents based on organosiloxane polymers are presently available on the open market. However, the known antifoam agents exhibit little effect or rapidly lose their effectiveness in aqueous systems containing alkaline or alkaline reacting materials.

It is the object of this invention to introduce a novel method for preparing improved antifoam agents. Another object is an antifoam agent which is effective in alkaline systems. Other objects and advantages of this invention are detailed in or will be apparent from the disclosure and claims following.

This invention consists of a method of preparing antifoam agents consisting essentially of heating a mixture of (1) a methylsiloxane polymer having a viscosity in the range 5–3000 cs. at 25° C., said polymer containing .25 to 25 mol percent $Me_3SiO_{1/2}$ units, up to 10 mol percent of units selected from $MeSiO_{3/2}$ and $SiO_{4/2}$ units and 65 to 99.75 mol percent $Me_2SiO$ units and (2) a pulverulent inorganic filler having an average particle size of from .01 to 25 microns in the presence of (3) an acid condensation catalyst.

The methylsiloxane polymers employed herein are known materials. The basic unit in these polymers is a dimethylsiloxane unit of the formula $(CH_3)_2SiO$. The dimethylsiloxane units comprise at least 65 mol percent and preferably 97.9 mol percent or more of the siloxane polymer. The balance of the units present can be trimethylsiloxy units of the formula $(CH_3)_3SiO_{1/2}$ which units can comprise up to 25 mol percent of the polymer but are preferably present in amounts of from 0.8 to 2 mol percent of the polymer. Other units which can be present are monomethylsiloxane units of the formula $CH_3SiO_{3/2}$ and unsubstituted siloxane units of the formula $SiO_{4/2}$ but such units are preferably kept to a minimum of less than 10 mol percent and desirably below 0.1 mol percent of the siloxane polymer. Thus, the preferred polymer is a trimethylsiloxy endblocked dimethylsiloxane of the polymeric formula $$(CH_3)_3SiO[(CH_3)_2SiO]_nSi(CH_3)_3$$

where $n$ is such that the viscosity of the polymer at 25° C. is from 5 to 3,000 cs. The ratio of methyl radicals to silicon atoms in the operative siloxane polymers is from 1.8/1 to 2.2/1.

The acid catalysts employed in the method of this invention effect a rearrangement of siloxane polymers under the reaction conditions employed. Accordingly, mixtures of methylsiloxane polymers having different viscosities and different polymeric units present can be employed so long as the average viscosity, average ratio of methyl to silicon and percentages of the various units permitted are within the limits set forth above. For example, one can employ mixtures of low viscosity trimethylsiloxy containing siloxanes such as $Me_3SiOSiMe_3$ and $$Me_3SiOMe_2SiOSiMe_3$$

and higher viscosity cyclic or linear siloxanes of unit formula

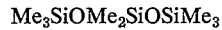

where $n$ has an average value from 1.8 to 2.0 [i.e. dimethylsiloxane polymers containing limited amounts of $MeSiO_{3/2}$ and/or $SiO_{4/2}$ units such that Me/Si is from 1.8/1 to 2.0/1]. In these siloxanes the valences of the Si atoms which are not satisfied by oxygen in the form of siloxane bonds or by methyl substituents are satisfied by any other atoms or radicals commonly appearing as substituents on silicon in siloxane polymers, e.g. —OH, alkoxy radicals and acyloxy radicals with fewer than 13 carbon atoms each.

It is to be understood that homopolymers, copolymers and mixtures can be employed so long as the viscosity, $CH_3/Si$ ratio and proportions and identity of units present are within the limits set forth herein.

The inorganic fillers employed herein are finely powdered materials such as aluminum oxides, titanium dioxides and particularly silicas exhibiting average particle size within the range 0.01 to 25 microns. The silicas are preferred and include precipitated silicas, silica aerogels, silica xerogels, and fume silicas. The inert inorganic filler is employed in amounts of from 1 to 30 percent by weight of the reaction mixture of siloxane and filler. Preferred products are obtained with from 3 to 10 parts by weight filler and 90 to 97 parts by weight siloxane polymer.

The acid catalysts employed in the method of this invention are those acid condensation catalysts commonly employed in organopolysiloxane chemistry. Operative acids are protonic acids and Lewis acids (see "Chemie und Technologie der Silicone" by W. Noll, published by Verlag Chemie G.m.b.H., Weinheim, Germany, 1960, pages 138–144) as well as compounds splitting off protonic acids in the presence of water. The dissociation constant of the operative protonic acids in dilute water solution at 25° C. is preferably not under $1 \times 10^{-5}$. In addition to effecting the condensation of hydroxyl groups, the acid catalysts effect a rearrangement or equilibration of the siloxane polymer. Preferred acid condensation catalysts are: $AlCl_3$, $FeCl_3$, $SnCl_4$, $TiCl_4$, $BF_3$, $ZnCl_2$ as well as phosphorous nitrile halides and organo nitrogen derivatives of phosphorous acid or phosphoric acid in which the nitrogen is substituted by organic radicals as described in United States Patent No. 2,830,967, issued April 15, 1958. Other acid catalysts employed to effect condensation of organosiloxanes are also suitable for use herein. The examples of acid catalysts given are preferred over the sulfuric acid and alkyl sulfuric acids, for instance, because the hydrogen halide formed during the condensation reaction can be removed from the reaction mass simply by heating. The acid catalysts are employed herein in quantities of from .01 to 5 percent by weight based on the weight of methylsiloxane polymer present.

The method of this invention can advantageously be carried forward in inert auxiliary fluids preferably organic solvents. Examples of useful solvents for this invention are aliphatic hydrocarbon solvents, aromatic hydrocarbon solvents, ethers, ketones, and chlorohydrocarbons boiling at 50°–250° C. Specific examples are benzene, toluene, xylene, ethylene glycol dimethylether, n-butyl ether, diethyl ether, acetone, dibutyl ketone, methylene chloride, chlorobenzene, benzine, n-heptane, octene and petroleum hydrocarbon solvents.

The siloxane polymer, inorganic filler and acid catalyst are admixed in any desired order with or without an inert organic solvent. The mass is then heated at 60° to 250° C., preferably 110° to 240° C. The desired reaction will occur at room temperature but the reaction time becomes impractically long, hence heating is preferred. The reaction can be carried forward under any desired pressure from sub-atmospheric to super-atmospheric but the reaction goes forward satisfactorily at atmospheric pressure, hence excess or partial pressure is not required.

The reaction of the siloxane polymer and filler mixture is carried forward for from 1 to 24 hours until the desired degree of alkali resistance is achieved. The alkali resistance of the product is tested as follows: A test mixture is prepared from 175 ml. of water, 25 ml. of a 30 weight percent water solution of a sodium paraffin sulfonate prepared by sulfo chlorination of a paraffin mixture with an average of 14–15 carbon atoms per molecule and subsequent saponification with caustic soda, and 50 ml. of an aqueous 1-N solution of NaOH. To this test mixture there is added 1 ml. of a 10 percent dispersion in toluene of the reaction product to be tested as an antifoam agent. The test mixture is then refluxed for 1 hour and if no foam appears during the refluxing, the reaction product is considered to be an alkali resistant antifoam agent.

After the siloxane filler reaction has been completed, the product can be homogenized on a 3-roll mill or in a high speed mixer if desired.

The antifoam agents prepared according to this invention exhibit excellent resistance to alkali. They can be employed in undiluted form or as a dispersion, in inert organic solvents or as aqueous emulsions of the oil in water type. The aqueous emulsions require the use of surface active emulsifiers such as methyl cellulose, sorbitol monostearate propylene glycol monolaurate, polyethylene glycol monostearate, polyethylene glycol trimethyl nonyl ether and other protective colloids, esters of polyalcoholates, and esters and ethers of glycols and polyglycols.

The antifoam agents prepared by the method of this invention retain their effectiveness even when stored in mixtures containing alkali materials. Thus, they are particularly useful as additives for alkaline cleaning products such as commercial soap and detergent laundry products for use in automatic washing machines wherein the development of foam is undesirable. The antifoam agent can be added to powdered materials such as laundry powders in the form of dispersions in organic solvent or water with subsequent drying.

The examples which follow do not limit the scope of the invention which is fully defined in the claims. The examples are merely to aid in understanding and practicing the invention. All parts and percentages in the examples are based on weight unless otherwise specified and all temperatures are in degrees centigrade. The symbol "Me" represents the methyl radical throughout this disclosure. All viscosities herein were measured at 25° C.

*Example 1*

A mixture of 900 g. of trimethylsiloxy endblocked dimethylpolysiloxane with a viscosity of 50 cst., 200 g. dimethylpolysiloxane with a viscosity of 400 cst., displaying terminal Si bonded OH groups, and 65 g. silica aerogel with a particle size of 0.3 to 3 microns was mixed with 1.5 g. mortar-ground $AlCl_3$ and heated for 10 hours at 180° C.

In the alkali resistance test described above, no foam could be observed after 16 hours of reflux boiling. An otherwise identical mixture of organopolysiloxanes and silicon dioxide not treated with aluminum chloride was ineffective after 2 minutes when tested for alkali resistance.

*Example 2*

1,000 g. of a dimethylpolysiloxane displaying terminal OH groups, with a viscosity of 800 cst., 250 g. hexamethyldisiloxane and 200 g. aluminum oxide with an average kernel size of 10 microns were mixed with 8 g. $SnCl_4$ and heated for 3 hours at 220° C. After cooling, the mixture was conducted through a 3-roll mill to obtain a product of maximum uniformity.

In the above test for alkali resistance, there was no foam formation to be observed after reflux boiling for 16 hours. 3 ml. of a 1 percent by weight dispersion of the antifoam in benzine boiling at 80° to 120° C. will immediately depress the foam of a 1 percent by weight aqueous solution of Na-laurylsulfate.

*Example 3*

A mixture was prepared from 50 g. of precipitated silica with a kernel size of 0.02 to 1.0 microns, 600 g. of a trimethylsiloxy endblocked dimethylpolysiloxane, 50 cst., and 0.7 g. phosphorus nitrile chloride and heated for 10 hours at 130° C.

The mixture obtained is emulsified with 85 g. polyethylene glycol stearate with 500 ml. water in a high speed mixer. 2 ml. of this dispersion in 1 liter of boiling aqueous solution of 5 g. Na-oleate and 1 g. Na-silicate will inhibit all foam formation for more than 10 hours.

That which is claimed is:

1. A method for preparing alkali-resistant antifoam agents consisting essentially of heating at 60°–250° C., for a period of from 1 to 24 hours, a mixture of (1) 70 to 99 percent by weight of a methylsiloxane polymer having a viscosity of 5–3000 cs. at 25° C., having a methyl to silicon ratio in the range from 1.8/1 to 2.2/1 and containing .25 to 25 mol percent $(CH_3)_3SiO_{1/2}$ units, up to 10 mol percent of units selected from the group consisting of $CH_3SiO_{3/2}$ and $SiO_{4/2}$ units, and 65 to 99.75 mol percent of $(CH_3)_2SiO$ units, (2) 1 to 30 percent by weight of a pulverulent inorganic filler selected from the group consisting of silicas, aluminum oxides and titanium dioxides having a particle size of from .01 to 25 microns in the presence of (3) .01 to 5 percent by weight based on the polymer (1) of an acid condensation catalyst selected from the group consisting of Lewis acids and protonic acids.

2. The method of claim 1 wherein the methylsiloxane polymer contains 0.8 to 2 mol percent $(CH_3)_3SiO_{1/2}$ units, up to 0.1 mol percent of $CH_3SiO_{3/2}$ units, up to 0.1 mol percent $SiO_{4/2}$ units and the balance of the units being $(CH_3)_2SiO$ units, the inorganic filler is a silica and the acid condensation catalyst is selected from the group consisting of Lewis acids and protonic acids.

3. The method of claim 1 wherein the siloxane polymer is a trimethylsiloxy endblocked dimethylsiloxane polymer, the filler is selected from the group consisting of silicas, aluminum oxides and titanium dioxides and the acid catalyst is $AlCl_3$.

4. The method of claim 1 wherein the siloxane polymer is a trimethylsiloxy endblocked dimethylsiloxane polymer, the filler is selected from the group consisting of silicas, aluminum oxides and titanium dioxides and the acid catalyst is $SnCl_4$.

5. The method of claim 1 wherein the siloxane polymer is a trimethylsiloxy endblocked dimethylsiloxane polymer, the filler is selected from the group consisting of silicas, aluminum oxides and titanium dioxides and the acid catalyst is a phosphorous nitrile halide.

References Cited by the Examiner

UNITED STATES PATENTS

| | | | |
|---|---|---|---|
| 2,389,477 | 11/1945 | Wright et al. | 260—46.5 |
| 2,457,688 | 12/1948 | Krieble et al. | 260—37 |
| 2,568,672 | 9/1951 | Warrick | 260—37 |
| 2,632,736 | 3/1953 | Currie | 252—358 |
| 2,894,913 | 7/1959 | Sullivan et al. | 252—358 |
| 2,972,579 | 2/1961 | Delfel | 252—358 |

JULIUS GREENWALD, *Primary Examiner.*

MORRIS LIEBMAN, *Examiner.*